Dec. 11, 1923.
J. C. LAWSON
1,477,067
BUMPER FOR VEHICLES
Filed May 7, 1923
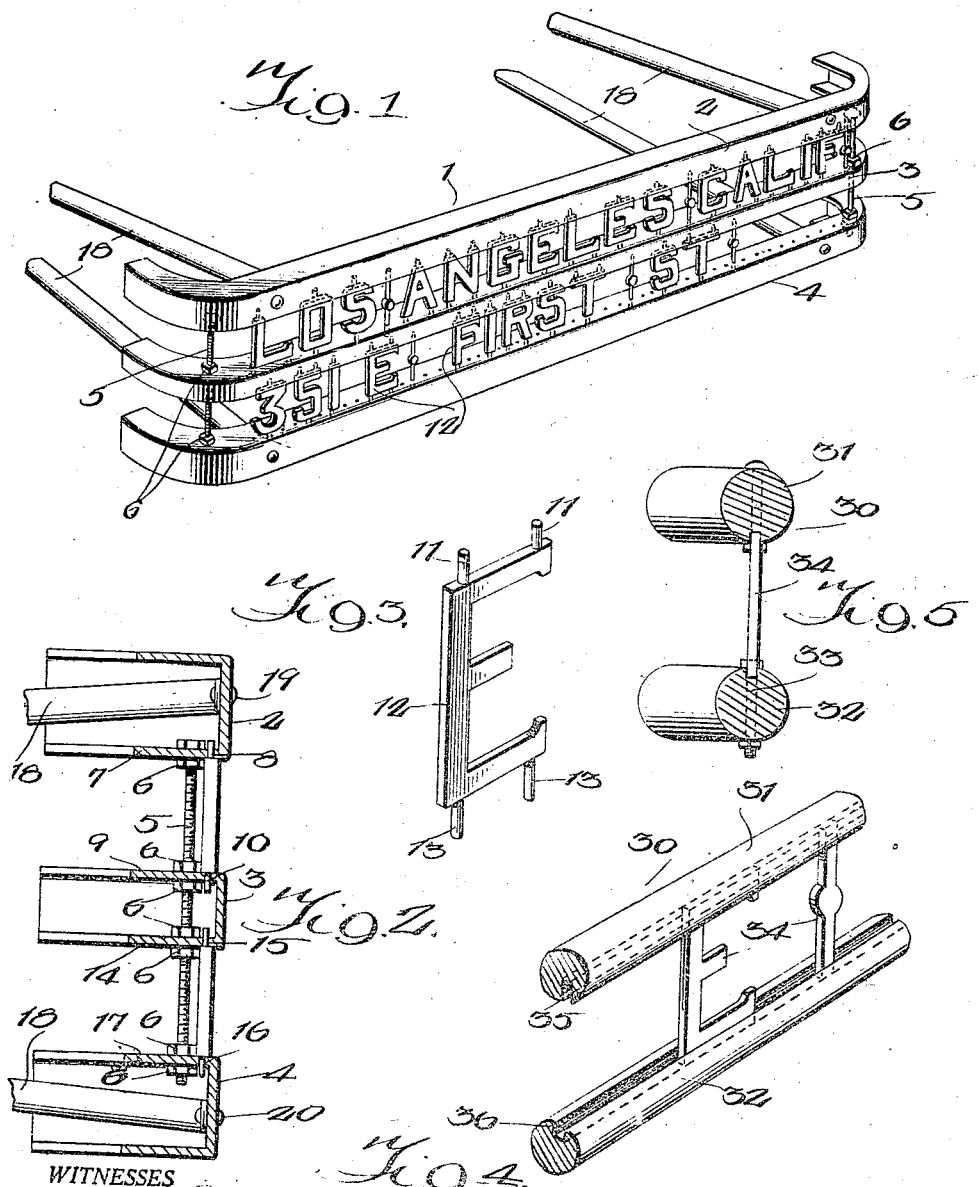
WITNESSES
INVENTOR
J. C. LAWSON,
BY
ATTORNEYS Patented Dec. 11, 1923.

1,477,067

UNITED STATES PATENT OFFICE.

JASPER CHRISTIANS LAWSON, OF LOS ANGELES, CALIFORNIA.

BUMPER FOR VEHICLES.

Application filed May 7, 1923. Serial No. 637,303.

*To all whom it may concern:*

Be it known that I, JASPER CHRISTIANS LAWSON, a citizen of the United States, and a resident of Los Angeles, in the county of Los Angeles and State of California, have invented certain new and useful Improvements in Bumpers for Vehicles, of which the following is a specification.

My invention relates to improvements in bumpers for vehicles, and it consists in the combinations, constructions and arrangements herein described and claimed.

An object of the invention is to provide a bumper which is designed primarily for application to motor vehicles and which is adapted to not only serve the purpose for which bumpers are ordinarily provided, but also to hold selected characters which may comprise words supplying information as to the place of residence of the owner of the motor vehicle, or which may supply other desirable data.

A further object of the invention is to provide a bumper of the character described which holds selected characters releasably so that any desirable fact pertaining to the vehicle may be presented at will, by selecting the proper characters to represent such fact.

A further object of the invention is to provide a bumper of the character described which is of simplified construction and strong and durable.

Other objects and advantages will be apparent from the following description, considered in conjunction with the accompanying drawings, in which:

Fig. 1 is a perspective view showing one form of bumper embodying the invention, Fig. 2 is a relatively enlarged vertical section through the bumper which is shown in Fig. 1, Fig. 3 is a perspective view of one of the characters which is adapted to be held by the bumper, Fig. 4 is a fragmentary perspective view of a modified form of bumper, and Fig. 5 is a vertical section through the form of bumper shown in Fig. 4.

Referring now to the drawings, and particularly to Figs. 1 and 2 thereof, the numeral 1 generally designates the body of a bumper embodying the invention. The body 1 comprises an upper elongated or bar-like member 2, an intermediate bar or elongated member 3 and a lower bar or elongated member 4. The bars 2, 3 and 4 are shown as having substantially straight intermediate portions and rearwardly curved end portions and each of these bars is shown as being of channel formation, the web portion thereof being vertically disposed and the sides extending rearwardly from the web portion. The bars 2, 3 and 4 are adjustably held in spaced parallel relation in respect to one another through the agency of vertically disposed threaded bolts 5 which extend through the lower side of the upper bar 2, completely through both sides of the intermediate bar 3 and through the upper side of the lower bar 4, each of the threaded bolts or rods 5 being engaged at suitable points along its length by nuts 6 which function to hold the respective bars in spaced relation in respect to one another. It will be apparent that the spacing of the respective bars in respect to one another may be varied at will by adjusting the position of certain or all of the nuts 6, along the threaded rods 5.

The lower side of the upper bar 2 is designated 7 and is provided with a series of openings 8 extending longitudinally of the bar. The upper side 9 of the intermediate bar 3 is provided with a series of spaced openings 10 extending longitudinally of the bar 3 in vertical alinement with the series of openings 8. Each of the openings 8 is adapted to receive an upstanding stud projection 11 at the upper end of the body 12 of a character, such as the letter "E," illustrated in Fig. 3. Each of the openings 10 is adapted to receive a depending stud projection 13 at the lower end of the body 12. The stud projections 11 and 13 are merged into the body 12 in such manner as to define shoulders at the juncture of each stud projection with the body. The lower side 14 of the intermediate bar 3 is provided with a series of openings 15 which extend longitudinally of the bar 3. The respective openings 15 are in vertical alinement with corresponding openings 16 extending through the upper side 17 of the lower bar 4. Each of the openings 15 is adapted to receive one of the upstanding studs 11 while each of the openings 16 is adapted to receive one of the depending studs 13 on the body 12 of one of the characters heretofore mentioned.

A pair of supporting rods 18 preferably is provided for attaching the bumper body 1 adjacent to each of its ends to the vehicle which is to be equipped with the invention.

In the embodiment of the invention illustrated in Figs. 1 and 2, one of the supporting rods 18 of each pair is secured at one end to the web of the upper bar 2, as at 19, while the other supporting rod 18 of each pair is secured to the web of the lower bar 4, as at 20. When the supporting rods 18 are fixedly secured to a fixed support, such as the body of a vehicle, and the respective bars comprising the bumper body are secured by means of the bolts or rods 5 and the nuts 6 in such spaced relation in respect to one another that the bodies 12 of the characters selected to present desirable data, are clamped in upright positions between the lower side of the upper bar 2 and the upper side of the intermediate bar 3, or the lower side of the intermediate bar 3 and the upper side of the lower bar 4, a bumper of relatively great strength will be provided. It will be manifest that the bodies 12 of the respective characters will aid the bolts or rods 5 and the nuts 6 in staying the adjacent bars of the bumper body to each other.

In assembling the characters and the respective bars of the bumper body, the nuts 6 on the bolts or rods 5 which are associated with the intermediate bar 3 and the lower bar 4, are arranged on the rods or bolts 5 so that the spacing between the upper side of the intermediate bar 3 and the lower side of the upper bar 2 and between the lower side of the intermediate bar 3 and the upper side of the lower bar 4 is slightly greater than the length of the body 12 and the studs 11 or 13. The bodies 12 of selected characters are then arranged between the upper bar 2 and the intermediate bar 3 or between the latter and the lower bar 4 so that the studs 11 will be received in either the openings 8 or the openings 15 and the studs 13 will be received in either the openings 10 or the openings 16. The nuts 6 associated with the intermediate bar 3 and with the lower bar 4 are then manipulated to secure the intermediate bar 3 and the lower bar 4 in the position in respect to each other and to the upper bar 2 illustrated in Figs. 1 and 2. The bodies 12 of the selected characters then will be held against displacement from the bumper body.

In the embodiment of the invention illustrated in Fig. 1, the characters shown as being arranged between the respective bars of the bumper body, indicate a place of residence, but obviously, characters similar to those shown may be used interchangeably with the particular characters illustrated, to indicate other data.

In Figs. 4 and 5, I show a portion of a bumper body which is designated generally at 30, which comprises an upper bar 31 and a lower bar 32, the bars 31 and 32 being held in spaced parallel relation by bolts and nuts such as that designated generally 33. A guideway and holder for characters such as the letters indicated at 34, is provided by forming a longitudinal groove 35 in the underside of the upper bar 31 and a similar longitudinal groove 36 in the upper side of the lower bar 32, the grooves 35 and 36 being in confronting relation to each other and being adapted respectively to receive the upper and lower end portions of the bodies of the characters 34. When the bolts and nuts 33 are adjusted, the bodies of the characters 34 will be clamped between the bars 31 and 32 and thus held against displacement from the position shown in Fig. 4.

Obviously, my invention is susceptible of embodiment in forms other than that illustrated in the accompanying drawings and I therefore consider as my own, all modifications and adaptations of the form of the device herein described and claimed which fairly fall within the scope of the appended claims.

I claim:—

1. A bumper comprising a plurality of similar bars adjustably held in spaced parallel relation, adjacent bars having their confronting sides adapted for engagement with the opposite ends of characters consisting of letters or the like.

2. A bumper comprising a plurality of similar bars, means for adjustably connecting the bars to hold them in spaced parallel relation, the bars adjacent each other having series of openings in their confronting sides, and a plurality of characters having projections on their opposite ends adapted to enter said openings.

3. A bumper comprising a plurality of similar bars, means for adjustably connecting the bars to hold them in spaced parallel relation, the bars adjacent each other having series of openings in their confronting sides, a plurality of characters having projections on their opposite ends adapted to enter said openings, and means whereby said bars may be attached to a fixed support.

4. In a bumper, a bumper body comprising a plurality of similar bars, each being of channel formation in cross section and including a web portion and a pair of parallel flange portions, a plurality of threaded rods extending through alined openings in the adjacent flanges of adjacent bars, nuts adjustably engaging each rod for holding the bars in adjusted parallel relation, said adjacent bars having other alined openings in the adjacent flanges thereof, and staying members arranged between adjacent bars and having reduced end portions received in said last named openings, said staying members also constituting characters for supplying desirable data.

5. In a bumper, a bumper body comprising a plurality of similar bars, each being of channel formation in cross section and including a web portion and a pair of parallel flange portions, a plurality of threaded rods extending through alined openings in the adjacent flanges of adjacent bars, nuts adjustably engaging each rod for holding the bars in adjusted parallel relation, said adjacent bars having other alined openings in the adjacent flanges thereof, staying members arranged between adjacent bars and having reduced end portions received in said last named openings, said staying members also constituting characters for supplying desirable data, and rods secured to the web portions of certain of said bars adjacent to opposite ends of the latter for attaching said bumper body to a vehicle.

6. In a bumper, a bumper body including a pair of spaced bars, each being channel shaped in cross sectional contour, said bars being disposed with the flanges thereof in parallel relation and having alined openings through the confronting flanges of the two bars, information supplying characters having reduced end portions received in the alined openings of said confronting flanges and having shoulders engaging with the flanges to stay the bars one to the other, and adjustable means connecting the bars to hold said confronting flanges in engagement with said characters, whereby the latter will be held against displacement and in bracing relation to the bars.

JASPER CHRISTIANS LAWSON.